March 31, 1936.  H. J. NEWELL  2,035,827
METHOD AND MEANS FOR MAKING MULTIFOCAL LENSES
Filed May 27, 1933
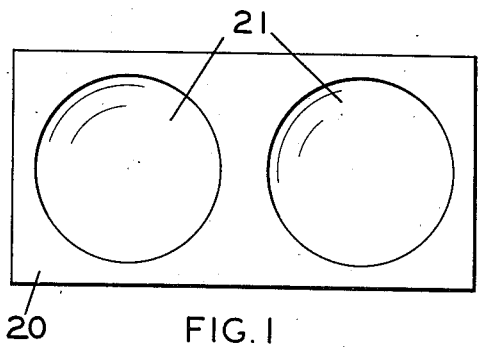
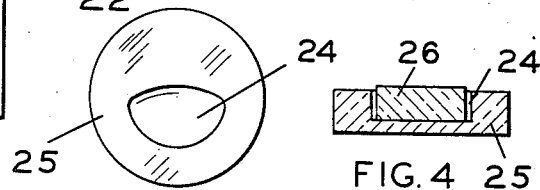
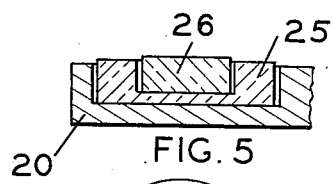
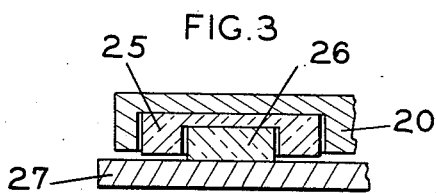
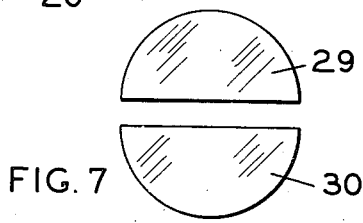
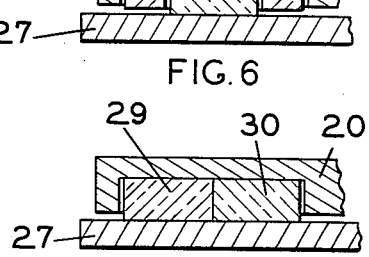
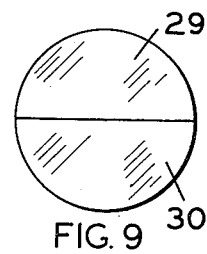
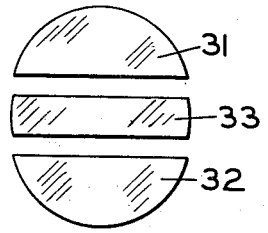
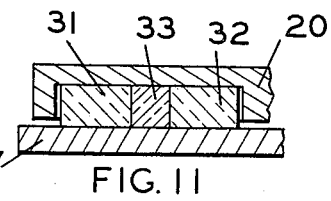
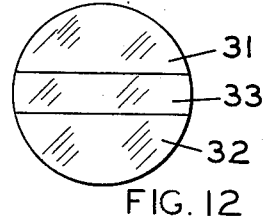
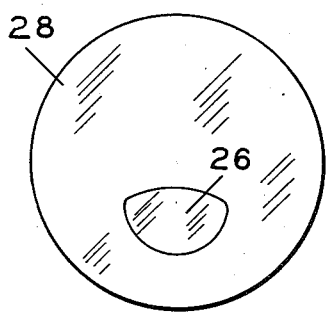
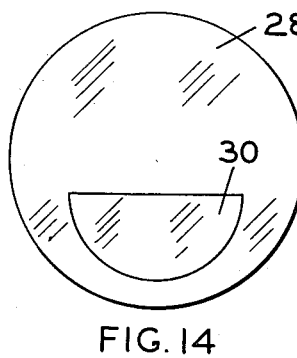
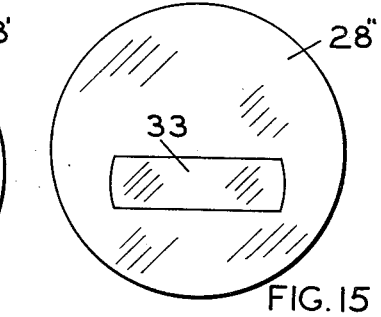
HOWARD J. NEWELL
INVENTOR
BY *J. H. Ellestad*
ATTORNEY Patented Mar. 31, 1936

2,035,827

UNITED STATES PATENT OFFICE 2,035,827

METHOD AND MEANS FOR MAKING MULTIFOCAL LENSES

Howard J. Newell, Rochester, N. Y., assignor to Bausch & Lomb Optical Company, Rochester, N. Y., a corporation of New York Application May 27, 1933, Serial No. 673,247

13 Claims. (Cl. 49—82.1)

This invention relates to the art of making fused multifocal lenses and more particularly it has reference to a method and means for fusing composite disks which are used for making fused multifocal lenses.

Certain types of fused multifocal lenses now on the market are made by forming a countersink in a major blank of glass and then fusing into the countersink a composite button or disk which has been made by fusing together two or more pieces of glass having different refractive indices. One of the objects of my invention is to provide an improved method and means for fusing composite disks for multifocal lenses. Another object is to provide an improved method and means for holding a plurality of pieces of glass during the fusing operation. A further object is to provide means formed of refractory material for holding a plurality of pieces of glass during the fusing operation. Other objects and advantages reside in certain novel features of construction, arrangement and combination of parts and in the method of constructing, arranging and using same as will hereinafter be more fully described.

Referring to the drawing:

Fig. 1 is a top plan view of my improved block for fusing composite disks.

Fig. 2 is a vertical sectional view of same.

Fig. 3 is a top plan view of glass disk used in making one type of fused bifocal.

Fig. 4 is a sectional view of same showing a glass insert in the depression.

Fig. 5 is a view showing the disk and insert positioned in my improved block.

Fig. 6 shows the block and glass parts as they are placed in the furnace for fusing.

Fig. 7 shows the component parts of another type of disk before fusing.

Fig. 8 shows same in fusing position.

Fig. 9 shows the fused disk.

Fig. 10 shows the component parts of still another type of disk.

Fig. 11 shows same in fusing position.

Fig. 12 shows the fused disk.

Fig. 13 shows the finished lens embodying the disk of Figs. 3–6.

Fig. 14 shows the finished lens embodying the disk of Figs. 7–9.

Fig. 15 shows the finished lens embodying the disk of Figs. 10–12.

A preferred method and means for practicing my invention is illustrated on the drawing wherein 20 indicates a flat slab or block of refractory material such as carborundum, clay or porcelain. The block 20 is provided with one or more recesses 21 which may have a substantially flat bottom 22 and a substantially vertical wall 23. The recesses may have a circular outline as shown or they may have any other desired shape or outline.

In making one type of fused multifocal lens a composite disk is formed by making a depression 24 in a piece of glass 25. A segment 26 of flint glass is then fitted snugly into the depression as shown in Fig. 4. The disk and segment are then placed into the recess 21 as shown in Fig. 5. The segment and disk are of such thicknesses that they project slightly above the surface of the block 20 as shown in Fig. 5. A flat slab 27 of refractory material is then placed on top of the projecting glass parts and the whole is inverted as shown at Fig. 6, and placed in a suitable furnace which is heated to fusing temperature. The flint glass segment 26 has a lower melting point than the crown glass of which the disk 25 is composed and hence the segment softens first. Due to the added weight of block 20 the softened flint glass is forced into the depression 24 so that the latter is filled. After the fused composite disk has been annealed it is removed from the block 20. The composite disk is then ground and polished and fused into a polished countersink in a major blank 28 of glass having substantially the same refractive index as disk 25 and the finished lens will appear as in Fig. 13.

In making another type of fused multifocal lens two substantially semi-circular pieces of glass 29 and 30 are positioned within the recess 21 in block 20, covered with the flat slab 27, inverted and placed in the fusing furnace in the position shown in Fig. 8. The fused composite disk, shown in Fig. 9, is then ground and polished and fused in a countersink of a major blank of glass 28'. The piece of glass 29 is formed of glass having substantially the same refractive index as the major blank so that when fused to the latter the piece 29 merges with the major blank and the piece 30 of flint glass, having a higher refractive index, provides the reading segment of the finished lens as shown in Fig. 14.

Still another type of fused multifocal lens requires a composite disk made up of two pieces of glass 31 and 32 of the same refractive index and a third piece 33 having a higher refractive index. These are assembled, placed in the recess of block 20, covered with a flat slab 27, inverted and placed in the fusing furnace. The fused composite disk, shown in Fig. 12, is then ground, polished and fused into a countersink in a major blank of glass 28''. The major blank 28'' has substantially the same refractive index as the pieces 31 and 32 and hence they merge upon fusing and leave the finished lens as shown in Fig. 15.

From the foregoing it will be apparent that I am able to attain the objects of my invention and provide an improved method and means for making composite disks for multifocal lenses. It is to be understood that the segments or pieces of glass 26, 30 and 33 may be made of flint glass, barium crown glass or any other type of glass having a refractive index higher than that of the major blank. I have not disclosed the details of grinding and polishing the fused composite disks and fusing them in the countersinks in the major blanks since such methods are well known to those skilled in the art. The recesses 21 in block 20 preferably have a very slightly tapered wall so that the fused disk can be readily removed. The blocks 20 can, of course, be used repeatedly. As above stated, the segment 26 fits snugly into the depression 24 and the disk and pieces of glass fit snugly within recess 21 in block 20 although the drawing shows relatively wide spacings between these parts for sake of clearness.

By means of my improved means and method I am able to retain the original size and shape of the glass segment 26. If the segment 26 were fused into the depression 24 without the use of a block or retaining means, the softened glass would have a tendency to flow outwardly so that the size of the disk and segment could not be accurately controlled. In lenses of the types embodying composite disks such as those of Figs. 9 and 12, for example, my improved method and means makes it possible to control the size and shape of the disk and segment. Various modifications can obviously be made without departing from the spirit of my invention.

I claim:

1. A method of joining a plurality of pieces of glass which comprises assembling said pieces with their edges in abutting relation, holding said pieces in such relation and substantially enclosing said pieces by refractory material and then subjecting to a glass fusing temperature.

2. A method of making composite disks for multifocal lenses which comprises assembling a plurality of pieces of glass, substantially surrounding said pieces on all sides by refractory material and then subjecting to a fusing temperature.

3. A method of making composite disks for multifocal lenses which comprises assembling a plurality of pieces of glass in edge to edge relation, fitting said assembled pieces snugly into a recess in a block of refractory material and subjecting the whole to a temperature sufficient to fuse said pieces together.

4. A method of making composite disks for multifocal lenses which comprises assembling a plurality of pieces of glass in edge to edge relation, at least two of said pieces having different refractive indices, substantially enclosing said pieces on all sides with refractory material and then subjecting the whole to a temperature sufficient to fuse said pieces together.

5. A method of making a composite disk for a multifocal lens which comprises forming a depression in a disk of glass, fitting a glass insert in said depression, said insert having a different refractive index than the disk, placing said disk in a recess in a block of refractory material with the disk projecting slightly above the face of the block and subjecting the whole to a glass fusing temperature.

6. A method of making composite disks for multifocal lenses which comprises assembling a plurality of pieces of glass in edge to edge relation, placing said pieces in a recess in a block of refractory material, said pieces being formed to fit snugly into said recess and project slightly above the face of said block, placing a slab of refractory material on top of the projecting part of said pieces, inverting said block, slab and pieces and subjecting to a glass fusing temperature.

7. Means for fusing composite disks comprising a plurality of pieces of glass, said means comprising a block of non-metallic refractory material, said block having a recess into which said pieces of glass are adapted to fit during the fusing operation and a slab of refractory material to cover said recess and pieces.

8. Means for making composite disks for multifocal lenses comprising a plurality of pieces of glass of different refractive indices, said means comprising a block of refractory material, said block having a recess into which said pieces of glass can be fitted, the depth of said recess being less than the thickness of said pieces of glass whereby said pieces project beyond the face of said block and a slab of refractory material contacting with the projecting parts of said pieces whereby said pieces are substantially enclosed by refractory material during the fusing operation.

9. A method of making composite disks for multifocal lenses which comprises assembling a plurality of pieces of glass of different refractive index and fusing said pieces together by subjecting them to a fusing temperature while confining them so that they will substantially retain their original sizes and shapes after the fusing operation.

10. A method of making composite disks for multifocal lenses which comprises placing a plurality of pieces of glass of different refractive index in assembled relation, fusing said pieces together by subjecting them to a fusing temperature while confining the pieces against lateral movement and applying pressure to the pieces in a vertical plane.

11. A method of making composite disks for multifocal lenses which comprises forming an opening in a disk of glass, fitting a glass insert in said opening, said insert having a different refractive index than the disk, and subjecting said disk and insert to fusing temperature while substantially enclosing said disk and insert by refractory material fitting snugly therearound.

12. A method of making composite disks for multifocal lenses which comprises forming an opening having a continuous wall in a disk of glass, providing a glass insert of different refractive index than the disk to fit snugly within said opening and subjecting the disk and insert to a fusing temperature while confining the outer wall of the disk so that the disk and insert will substantially retain their original sizes and shapes after the fusing operation.

13. A method of making composite disks for multifocal lenses which comprises forming an opening in a disk of glass, fitting into said opening a glass insert of different refractive index than said disk, subjecting the disk and insert to fusing temperature while confining the disk by refractory material so as to substantially preserve the original size and shape of the disk after the fusing operation.

HOWARD J. NEWELL.